United States Patent
Talmor et al.

(10) Patent No.: US 6,510,415 B1
(45) Date of Patent: Jan. 21, 2003

(54) VOICE AUTHENTICATION METHOD AND SYSTEM UTILIZING SAME

(75) Inventors: Eli Talmor, Haifa (IL); Rita Talmor, Haifa (IL); Alon Talmor, Haifa (IL)

(73) Assignee: Sentry Com Ltd., Haifa (IL)

(*) Notice: Subject to any disclaimer, the term of this patent is extended or adjusted under 35 U.S.C. 154(b) by 0 days.

(21) Appl. No.: 09/526,088

(22) Filed: Mar. 15, 2000

(30) Foreign Application Priority Data

Apr. 15, 1999 (IL) ............................................. 124951

(51) Int. Cl.⁷ .............................................. G10L 17/00
(52) U.S. Cl. ........................ 704/273; 704/246; 704/270
(58) Field of Search ........................... 704/270, 273, 704/275, 243, 256, 246; 379/88; 382/115

(56) References Cited

U.S. PATENT DOCUMENTS

| | | | |
|---|---|---|---|
| 3,991,271 A | 11/1976 | Branscome et al. | 178/95 R |
| 4,013,837 A | 3/1977 | Branscome et al. | 179/1.55 |
| 4,020,285 A | 4/1977 | Branscome et al. | 179/1.5 R |
| 4,100,370 A | 7/1978 | Suzuki et al. | 179/15 B |
| 4,468,204 A | 8/1984 | Scott et al. | 434/309 |
| 4,534,056 A | 8/1985 | Feilchenfeld et al. | 381/42 |
| 4,590,604 A | 5/1986 | Feilchenfeld | 381/42 |
| 4,797,672 A | 1/1989 | Kousa | 340/25.3 |
| 4,821,027 A | 4/1989 | Mallory et al. | 340/521 |
| 4,864,642 A | 9/1989 | Ueno et al. | 455/277 |
| 4,865,072 A | 9/1989 | Logsdon | 137/360 |
| 5,023,901 A | 6/1991 | Sloan et al. | 379/38 |
| 5,054,083 A | 10/1991 | Naik et al. | 381/42 |
| 5,127,043 A | 6/1992 | Hunt et al. | |
| 5,142,565 A | 8/1992 | Ruddle | 379/95 |
| 5,216,720 A | 6/1993 | Naik et al. | |
| 5,245,694 A | 9/1993 | Zwern | |
| 5,265,191 A | 11/1993 | McNair | 704/273 |
| 5,297,194 A | 3/1994 | Hunt et al. | 379/88 |
| 5,365,574 A | 11/1994 | Hunt et al. | 379/88 |
| 5,414,755 A | 5/1995 | Bahler et al. | 379/67 |
| 5,461,697 A | 10/1995 | Nishimura et al. | |
| 5,499,288 A | 3/1996 | Hunt et al. | 379/88 |
| 5,502,759 A | 3/1996 | Cheng et al. | 379/88 |
| 5,526,465 A | 6/1996 | Carey et al. | |
| 5,623,539 A | 4/1997 | Bassenyemukasa et al. | 379/88 |
| 5,625,747 A | 4/1997 | Goldberg et al. | 704/243 |
| 5,644,727 A * | 7/1997 | Atkins | 395/240 |
| 5,666,466 A | 9/1997 | Lin et al. | 704/246 |
| 5,745,555 A * | 4/1998 | Mark | 379/95 |
| 5,774,525 A | 6/1998 | Kanevsky et al. | 379/88 |
| 5,774,858 A | 6/1998 | Taubkin et al. | 704/273 |
| 5,875,437 A * | 2/1999 | Atkins | 705/40 |
| 5,926,533 A * | 7/1999 | Gainsboro | 379/188 |
| 5,999,611 A * | 12/1999 | Tatchell et al. | 379/211 |
| 6,016,476 A * | 1/2000 | Maes et al. | 705/1 |
| 6,038,334 A * | 3/2000 | Hamid | 382/124 |
| 6,079,621 A * | 6/2000 | Vardanyan et al. | 235/487 |
| 6,084,967 A * | 7/2000 | Kennedy et al. | 380/247 |
| 6,091,835 A * | 7/2000 | Smithies et al. | 382/115 |
| 6,160,903 A * | 12/2000 | Hamid et al. | 382/115 |
| 6,205,204 B1 * | 3/2001 | Morganstein et al. | 379/67.1 |
| 6,213,391 B1 * | 4/2001 | Lewis | 235/380 |
| 6,259,805 B1 * | 7/2001 | Freedman et al. | 382/124 |
| 6,266,640 B1 * | 7/2001 | Fromm | 704/273 |
| 6,366,682 B1 * | 4/2002 | Hoffman et al. | 382/115 |
| 6,434,520 B1 * | 8/2002 | Kanevsky et al. | 704/243 |

OTHER PUBLICATIONS

Beek et al, Speaker Authentication and Voice Data Entry, *USA XR 179–1VC*, pp 265–273.

* cited by examiner

Primary Examiner—Susan McFadden
(74) Attorney, Agent, or Firm—Mark M. Friedman

(57) ABSTRACT

A system for authorizing user access to a secure site includes a memory unit, first and second input devices, and first and second processing devices. The memory unit stores voice prints and identities of the set of individuals that have access to the secure site. The first input device is for inputting information that identifies the user as a member of the set. The second input device is for inputting temporary user voice data. The first processing device is for generating a temporary voice print from the temporary data. The second processing device is for comparing the temporary voice print to the stored voice prints. Access is granted only if the temporary voice print is most similar to the voice print of the individual that the user claims to be.

36 Claims, 8 Drawing Sheets

VOICE AUTHENTICATION METHOD AND SYSTEM UTILIZING SAME

FIELD AND BACKGROUND OF THE INVENTION

The present invention relates to a voice authentication method and a system utilizing same and, more particularly, to a system and method which compare a voice print of a user with each of a plurality of stored voice prints of known individuals, and provide authentication only if the user voice print is most similar to a stored voice print of an individual the user claims to be among all other stored voice prints.

The use of various types of methods to secure systems from unauthorized access is common practice in financial institutions, banks, electronic commerce Internet sites, computer networks and the like.

Currently available physical authentication devices which are frequently used to access secure systems, such as crypto cards, limited access cards, or keys, provide low security protection, since such devices can be lost, stolen, loaned to an unauthorized individual and/or duplicated.

Another and more sophisticated approach for authentication, which is used to provide higher security protection, is known in the art as biometric authentication. Biometric authentication involves identification of unique body characteristics, such as, fingerprints, retinal scans, facial recognition and voice pattern authentication.

Retinal scanning is based on the fact that retinal blood vessel patterns are unique and do not change over lifetime. Although this feature provides high degree of security, retinal scanning has limitations since it is expensive and requires complicated hardware and software for implementation.

Finger printing and facial recognition also requires expensive and complicated hardware and software for implementation.

Voice verification, which is also known as voice authentication, voice pattern authentication, speaker identity verification and voice print, is used to provide a speaker's identification. Voice pattern authentication differs from voice pattern recognition. In voice pattern recognition, or speech recognition the speaker utters a phrase (e.g., a word, such as a password) and the system determines the spoken word b) selecting from a pre-defined vocabulary. Therefore voice recognition provides for the ability to recognize a spoken phrase and not the identity of the speaker.

The terms voice verification and voice authentication are interchangeably used hereinbelow. Techniques of voice verification have been extensively described in U.S. Pat. Nos. 5,502,759; 5,499,288; 5,414,755; 5,365,574; 5,297,194; 5,216,720; 5,142,565; 5,127,043; 5,054,083; 5,023,901; 4,468,204 and 4,100,370, all of which are incorporated by reference as if fully set forth herein. These patents describe numerous methods for voice verification.

Voice authentication seeks to identify the speaker based solely on the spoken utterance. For example, a speaker's presumed identity may be verified using a feature extraction and pattern matching algorithms, wherein pattern matching is performed between features of a digitized incoming voice print and those of previously stored reference samples. Features used for speech processing involve, for example, pitch frequency, power spectrum values, spectrum coefficients and linear predictive coding, see B. S. Atal (1976) Automatic recognition of speakers from their voice. Proc. IEEE, Vol. 64, pp. 460–475, which is incorporated by reference as if fully set forth herein.

Alternative techniques for voice authentication include, but are not limited to, neural network processing, comparison of a voice pattern with a reference set, password verification using selectively adjustable signal thresholds, and simultaneous voice recognition and verification.

State-of-the-art feature classification techniques are described in S. Furui (1991) Speaker dependent-feature extraction, recognition and processing techniques. Speech communications, Vol. 10, pp. 505–520, which is incorporated by reference as if fully set forth herein.

Text-dependent speaker recognition methods rely on analysis of predetermined utterance, whereas text-independent methods do not rely on any specific spoken text. In both case, however, a classifier produces the speaker's representing metrics which is thereafter compared with a preselected threshold. If the speaker's representing metrics falls below the threshold the speaker identity is confirmed and if not, the speaker is declared an impostor.

The relatively low performance of voice verification technology has been one main reason for its cautious entry into the marketplace. The "Equal Error Rate" (EER) is a calculation algorithm which involves two parameters: false acceptance (wrong access grant) and false rejection (allowed access denial), both varying according the degree of secured access required, however, as shown below, exhibit a tradeoff therebetween. State-of-the-art voice verification algorithms (either text-dependent or text-independent) have EER values of about 2%.

By varying the threshold for false rejection errors, false acceptance errors are changing as graphically depicted in FIG. 1 of J. Guavain, L. Lamel and B. Prouts (March, 1995) LIMSI 1995 scientific report, which is incorporated by reference as if fully set forth herein. In this Figure presented are five plots which correlate between false rejection rates (abscissa) and the resulting false acceptance rates for voice verification algorithms characterized by EER values of 9.0%, 8.3%, 5.1%, 4.4% and 3.5%. As mentioned above, there is a tradeoff between false rejection and false acceptance rates, which renders all plots hyperbolic, wherein plots associated with lower EER values fall closer to the axes.

Thus, by setting the system for too low false rejection rate, the rate of false acceptance becomes too high and vice versa.

Various techniques for voice-based security systems are described in U.S. Pat. Nos. 5,265,191; 5,245,694; 4,864,642; 4,865,072; 4,821,027; 4,797,672; 4,590,604; 4,534,056; 4,020,285; 4,013,837; 3,991,271; all of which are incorporated by reference as if fully set forth herein. These patents describe implementation of various voice-security systems for different applications, such as telephone networks, computer networks, cars and elevators.

However, none of these techniques provides the required level of performance, since when a low rate of false rejection is set, the rate of false acceptance becomes unacceptably high and vice versa.

To try and overcome the above mentioned limitation of prior art systems, U.S. Pat. No. 5,913,196 to the present inventors, describes a computerized system which includes at least two voice authentication algorithms. Each of the voice authentication algorithms is different from the others and serves for independently analyzing a voice of the speaker for obtaining an independent positive or negative authentication of the voice by each of the algorithms. If every one of the algorithms provide positive authentication, the speaker is positively identified, whereas, if at least one of the algorithms provides negative authentication, the speaker is negatively identified.

Although the authentication system and method described in U.S. Pat. No. 5,913,196 is considerably more accurate than other prior art voice authentication systems, it still suffers from limitations common to prior art systems, which limitations arise from signal distortion (due to, for example, channel mismatch), user error and random background noise.

There is thus a widely recognized need for, and it would be highly advantageous to have, a voice authentication system and method for authorizing or denying a user access to a secure site, which system and method are devoid of the above limitations.

SUMMARY OF THE INVENTION

According to one aspect of the present invention there is provided a system for authorizing a user access to a secure site, the system comprising (a) a memory unit being for storing information including a stored voice print and an identity of each of a plurality of individuals having access to the secured site, the stored voice print of each of the plurality of individuals being generated from a corresponding voice data thereof; (b) a first input device being for inputting user information, the user information being for verifying that a user identifies him- or herself as a specific individual among the plurality of individuals; (c) a second input device being for inputting temporary voice data of the user; (d) a first processing unit being for generating a temporary voice print of the user from the temporary voice data received from the second input device; and (e) a second processing unit being for comparing the temporary voice print received from the first processing unit to the stored voice print of each of at least a portion of the plurality of individuals, at least the portion of the plurality of individuals including the specific individual, such that the user is granted access to the secure site only if the temporary voice print is most similar to the stored voice print of the specific individual.

According to another aspect of the present invention there is provided a method of authorizing a user access to a secure site, the method comprising the steps of (a) providing a memory unit being for storing information including a stored voice print and an identity of each of a plurality of individuals, the stored voice print of each of the plurality of individuals being generated from corresponding voice data thereof; (b) collecting user information provided by a user, the user information being for verifying that the user identifies him- or herself as a specific individual among the plurality of individuals; (c) processing temporary voice data collected from the user into a temporary voice print; (d) comparing the temporary voice print with the stored voice print of each of at least a portion of the plurality of individuals, at least the portion of the plurality of individuals including the specific individual; and (e) granting the user with access to the secure site only if the temporary voice print is most similar to the stored voice print of the specific individual.

According to further features in preferred embodiments of the invention described below, the first input device is selected from the group consisting of a keypad and a microphone, thus, the user information is provided via an in put device selected from the group consisting of a keypad and a microphone.

According to still further features in the described preferred embodiments the first input device communicates with the first processing unit via a communication mode selected from the group consisting of telephone communication, cellular telephone communication, computer network communication and radiofrequency communication, thus, the user information is provided via an input device selected from the group consisting of a telephone, a cellular telephone, a computer and radiofrequency communication device.

According to still further features in the described preferred embodiments the second input device includes a microphone, thus, the temporary voice data is collected by a microphone.

According to still further features in the described preferred embodiments the second input device communicates with the first processing unit via a communication mode selected from the group consisting of telephone communication, cellular telephone communication, computer network communication and radiofrequency communication, thus, the temporary voice data is collected by an input device selected from the group consisting of a telephone, a cellular telephone, a computer and radiofrequency communication device.

According to still further features in the described preferred embodiments the first input device and the second input device are integrated into a single input device, whereas the single input device includes a microphone, thus, the user information and the temporary voice data are collected by a single input device, a microphone.

According to still further features in the described preferred embodiments the temporary voice data includes the user information.

According to still further features in the described preferred embodiments the first processing unit and the second processing unit are integrated into a single processing unit, thus, steps (c) and (d) are effected by a single processing unit.

According to still further features in the described preferred embodiments the stored voice print of each of the plurality of individuals has been generated by the first processing unit.

According to still further features in the described preferred embodiments comparing the temporary voice print received from the first processing unit to the stored voice print of each of at least the portion of the plurality of individuals is effected by a voice authentication algorithm selected from the group consisting of a text-dependent and a text independent voice authentication algorithms.

According to still further features in the described preferred embodiments the voice authentication algorithm is selected from the group consisting of feature extraction followed by pattern matching, a neural network algorithm, a dynamic time warping algorithm, the hidden Markov model algorithm and a vector quantization algorithm.

According to still further features in the described preferred embodiments the first processing unit processes the user information so as to validate that the user identifies him- or herself as a specific individual of the plurality of individuals prior to generating the temporary voice print.

According to still further features in the described preferred embodiments the plurality of individuals includes at least 10 individuals.

According to still further features in the described preferred embodiments the corresponding voice data of each of the plurality of individuals includes a plurality of independent voice data inputs.

According to still further features in the described preferred embodiments the stored voice print of each of the plurality of individuals is generated from at least one of the plurality of independent voice data inputs.

According to still further features in the described preferred embodiments access is granted if a distortion level between the temporary voice print and the most similar stored voice print of the specific individual is less than a distortion level between the temporary voice print and the stored voice print of all other individuals of at least the portion of the plurality of individuals, thus, step (c) of the method is effected by comparing a distortion level between the temporary voice print and the stored voice print of each of at least the portion of the plurality of individuals.

According to still further features in the described preferred embodiments the first processing unit also extracts at least one voice feature from the temporary voice data.

According to still further features in the described preferred embodiments the secure site is selected from the group consisting of a virtual site, and a physical site.

According to still further features in the described preferred embodiments the virtual site is a World Wide Web site.

The present invention successfully addresses the shortcomings of the presently known configurations by providing a system and a method which compare a voice print of a user with each of a plurality of stored voice prints of known individuals, and provide authentication only if the user voice print is most similar to a stored voice print of in individual the user claims to be among all other stored voice prints.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
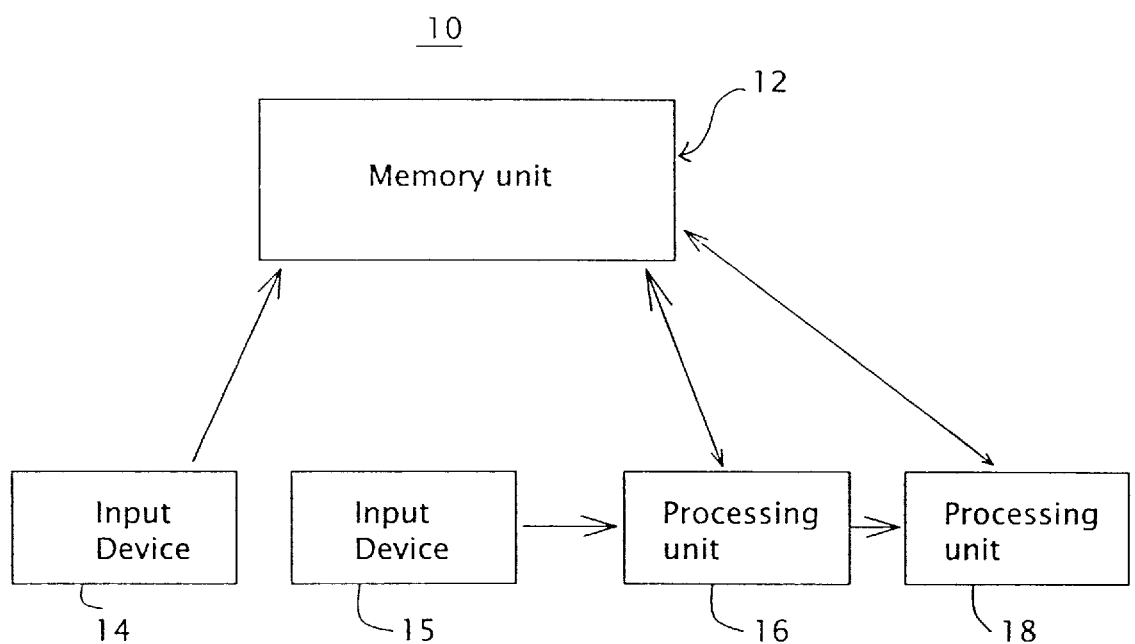
FIG. 1 is a black box diagram depicting the system of the present invention.

The present invention is of a system and method which can be utilized to authorize access to a secure site. Specifically, the present invention can be used to compare a voice print generated from voice data collected from a self identifying user to a database of stored voice prints of known individuals, such that the user is granted access to the secure site only if the users voice print is most similar to that of a known individual the user claims to be.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates the system of the present invention which is referred to hereinunder as system 10.

System 10 serves to authorize (or deny) access to a secure site. As used herein, the phrase "secure site" refers to both a physical site to which physical access can be authorized (or denied) by system 10, such as for example, a secure military or governmental installation, or alternatively a secure site can be a virtual site which is accessed via a computer, such as for example a World Wide Web site.

System 10 includes a memory unit 12 which serves for storing information preferably in the form of a database including lookup tables. According to the present invention, this information includes a stored voice print and an identity of each of a plurality of individuals, preferably more than ten individuals. As such, each of the plurality of individuals is recognizable by both the voice print and the identifying information stored in memory unit 12. The stored voice print of each individual is generated from corresponding voice data thereof. This voice data is provided by the individual and may be stored by memory unit 12.

As used herein the phrase "voice data" refers to words or phrases uttered by an individual and collected, for example, into memory 12 as one or more individual inputs.

A "voice print" is typically generated by extracting voice features from a word or phrase uttered by an individual. Such features are specific to each individual and as such can be used to characterize that individual. For further detail, see, for example, U.S. Pat. Nos. 5,265,191; 5,245,694; 4,864,642; 4,865,072; 4,821,027; 4,797,672; 4,590,604; 4,534,056; 4,020,285; 4,013,837; 3,991,271 and 5,913,196.

According to one preferred embodiment of the present invention, the voice data includes a plurality of independent voice data inputs. Such inputs can include a plurality of different words, or the same word uttered at different times, under different environmental noise conditions or by using different input devices.

According to another preferred embodiment of the present invention, the stored voice print of each individual is obtained by averaging any number of voice prints of the same individual.

In any case, the voice data collected from an individual includes enough data such that the voice print generated therefrom is specific and representative of the individual under various conditions of background noise, distortion and the like.

System 10 further includes a first input device 14. Device 14 serves for inputting user information which serves for verifying that the user which inputs the user information is a specific individual of plurality of individuals stored in memory unit 12. Device 14 can be any input device, which can be used for data input. For example, device 14 can be a keypad, in which case the user identifies him- or herself by a user specific code. Alternatively, device 14 can be a microphone in which case a word or a phrase uttered by the user can be used for user identification. It will be appreciated in this case that identification is effected by voice recognition which provides for the ability to recognize a word or a spoken phrase.

According to another preferred embodiment of the present invention device 14 is provided remote from other components of system 10. In such a case device 14 communicates with system 10 via standard telephony, cellular communication, radiofrequency communication or the Internet. As such, device 14 can be any devices capable communicating user information via such modes of communication. For example, device 14 can be a cellular telephone which can be used to input either keypad (code) information or voice information which can be utilized for user identification. Alternatively device 14 can be a personal computer provided with a sound card, in which case voice data can be provided via a telephone or a computer network (Internet).

It will be appreciated that in some cases the identity of the user can be automatically established by system 10 without the need for the user to actively provide user information. For example, if device 14 is the user's personal cellular telephone or personal computer, then the user can be automatically identified by system 10 upon establishment of contact therewith, providing that system 10 stores information on the cellular telephone number or the IP number of the personal computer of the user.

It will be appreciated, that following input of user information and preferably only in cases wherein the user identifies as a specific individual of the plurality of individuals, system 10 of the present invention proceeds with user voice data input as further described hereinbelow.

According to the present invention, system 10 further includes a second input device 15 which serves for inputting user temporary voice data. The temporary voice data is preferably similar in content to a portion of the (corresponding) voice data of the plurality of individuals. Thus, the user inputs an uttered word or phrase which corresponds in content to at least one uttered word or phrase previously inputted by that user.

Second input device 15 can be any device, remotely provided or not, which can be utilized for inputting temporary voice data.

According to another preferred embodiment of the present invention device 15 and device 14 are integrated into a single device. Thus according to this embodiment the temporary voice data also includes the user information such that a word or a phrase uttered by the user serves both for user identification and for generating the temporary voice print of the user.

System 10 of the present invention also includes a first processing unit 16 which serves for generating a temporary voice print from the temporary voice data inputted by the user via device 15.

It will be appreciated that processing unit 16 and device 15 can be integrated into a single device, such as for example, a personal computer, which can be provided remote from system 10. Thus, feature extraction can be effected and communicated to system 10 and processed thereby as further described below. This feature of the present invention is advantageous in that it eliminates channel mismatch, channel data degradation and/or packet delays. In addition, it also reduces the computational burden imposed on system 10.

System 10 further includes a second processing unit 18. Processing unit 18 serves for comparing the temporary voice print received from processing unit 16 to the stored voice print of each of at least a portion (or all) of the individuals stored in memory unit 12. It will be appreciated that the portion of individuals includes the specific individual the user claims to be.

According to another preferred embodiment of the present invention processing units 16 and 18 are integrated into a single processing unit which performs both voice print generation and voice print comparisons.

It will be appreciated that any one or more of numerous voice authentication algorithms known in the art can be utilized by the present invention to compare the temporary voice print with the voice prints of at least the portion of the individuals.

Such a voice authentication algorithm can be text-dependent or text-independent voice authentication algorithms utilizing, for example, feature extraction followed by pattern matching, a neural network algorithm, a dynamic time warping algorithm, the hidden Markov model algorithm, a vector quantization algorithm or any other appropriate algorithm.

According to another preferred embodiment of the present invention, access to the secure site is granted if a distortion level between the temporary voice print and the most similar stored voice print of the specific individual is less than a distortion level between the temporary voice print and the stored voice print of all other individuals of at least the portion of the plurality of individuals.

According to another preferred embodiment of the present invention, the content of the temporary voice data is determined by system 10. System 10 can, for example, prompts the user to say random phrases or terms. This is especially advantageous in cases of a remote device 15, since it prevents the user from deceiving system 10 by playing back recorded voice data.

Thus, system 10 of the present invention employs a voice authentication method which grants a user access to a secure site only if the temporary voice print thereof is most similar to the stored voice print of an individual the user claims to be among all other or a portion of all other individuals.

Figure 2:
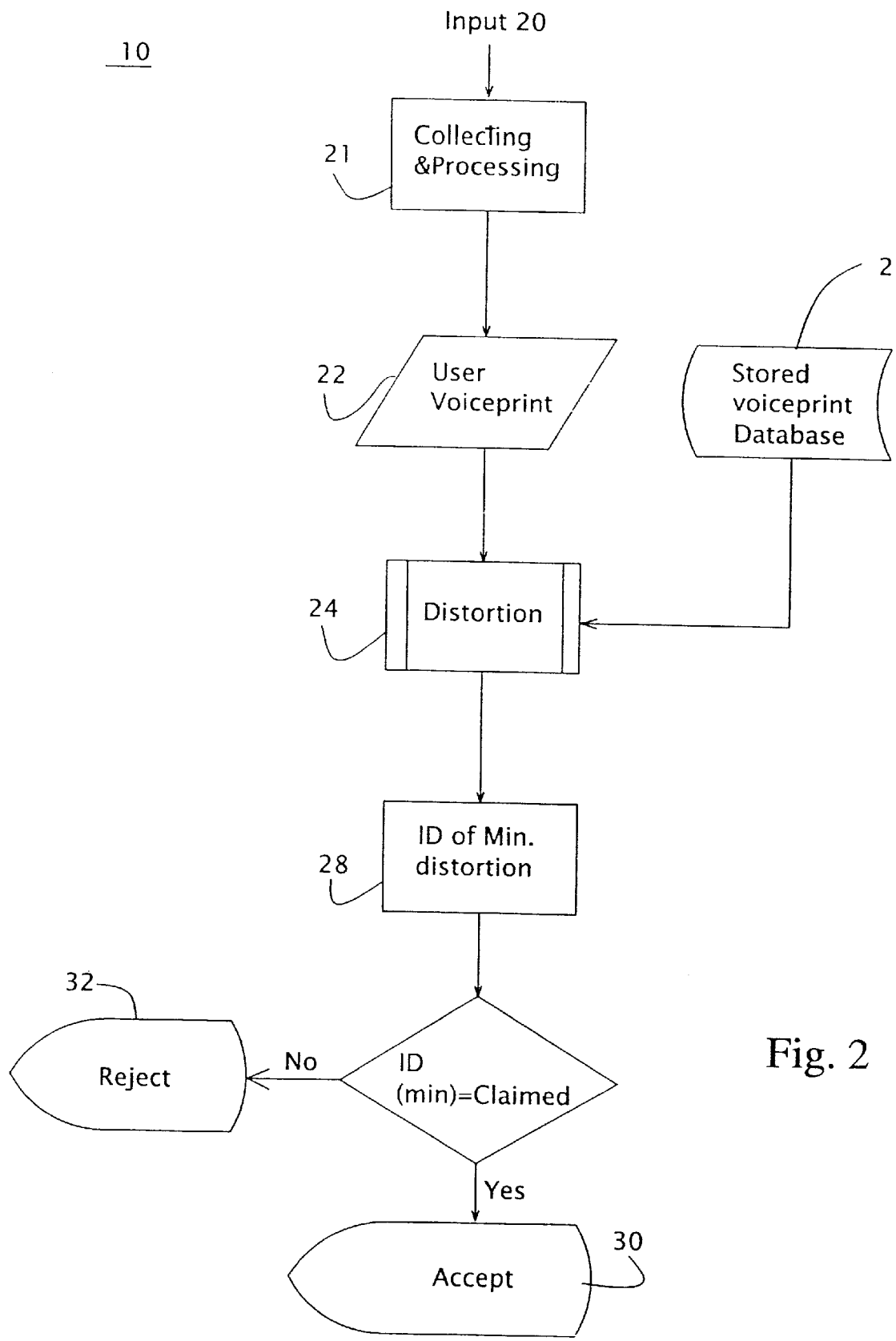
FIG. 2 is a flow chart diagram depicting the steps of the voice authentication method of the present invention.

This unique verification method employed by system 10 of the present invention is further described in the flow chart diagram of FIG. 2. Thus, a user self identifies to system 10 as is further described above. Following which, a temporary voice data input 20 is collected, the various voice features are extracted therefrom and processed (shown by 21) so as to generate temporary voice print 22. A distortion metrics 24 is calculated between temporary voice print 22 and each stored voice print of a stored voice print database 26. Each stored voice print is generated from previously inputted voice data of an individual of known identity. A stored voice print which has minimal distortion 28 as compared to temporary voice print 22 is found and the identity of the specific individual corresponding to the specific stored voice print is ascertained. If the identity of this individual coincides with that claimed by the user, then authorization is accepted (30), if not then authorization is denied (32).

It will be appreciated, that the voice print authentication method according to the present invention provides numerous advantages over prior art designs.

Figure 3:
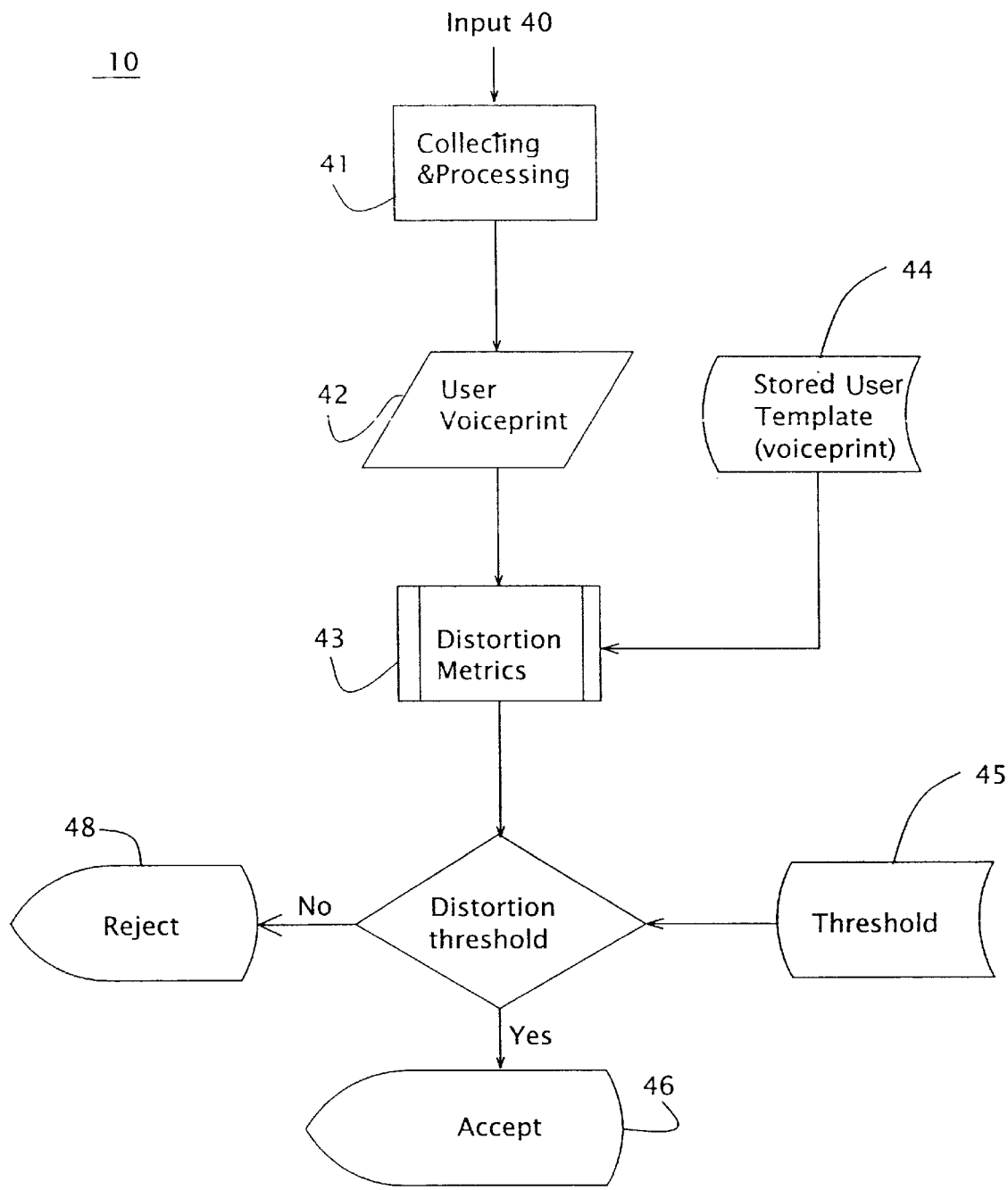
FIG. 3 is a flow chart diagram depicting the steps of a typical prior art voice authentication method.

As specifically illustrated in the flow chart diagram of FIG. 3, prior art authentication methods rely on a threshold comparison between a temporary voice print inputted upon authentication and a previously stored voice print of that user.

Thus, in prior art methods, following user identification, the voice data 40 of the user is collected, the various voice features are extracted therefrom and processed (as shown by 41) so as to generate temporary voice print 42. A distortion metrics 43 is calculated between the generated temporary voice print 42 and previously stored template of the same user 44 and compared to a predetermined threshold 45. Authorization 46 is obtained if the distortion is less then a pre-selected threshold 45, all other cases are rejected.

Thus, in prior art methods the likelihood of obtaining false acceptance or false rejection results depend on the threshold set by the system. Thus, the threshold level determines the results obtained, and as such the level of performance of such prior art methods is unacceptable at times, since when the threshold level is set in order to achieve low rate of false rejection, the rate of false acceptance becomes unacceptably high and vice versa.

In sharp contrast, the method employed by system 10 of the present invention does not require a preset threshold, since it depends on matching the temporary voice print with a database of stored voice prints, finding the most similar stored voice print and comparing the identity of the individual corresponding to the matched stored voice print with that claimed by the user.

The following section describes in greater detail some of the more preferred features of the present invention.

As already mentioned hereinabove, in cases of remote temporary voice data input, such data is also preferably processed at the remote site of input.

Figure 4:
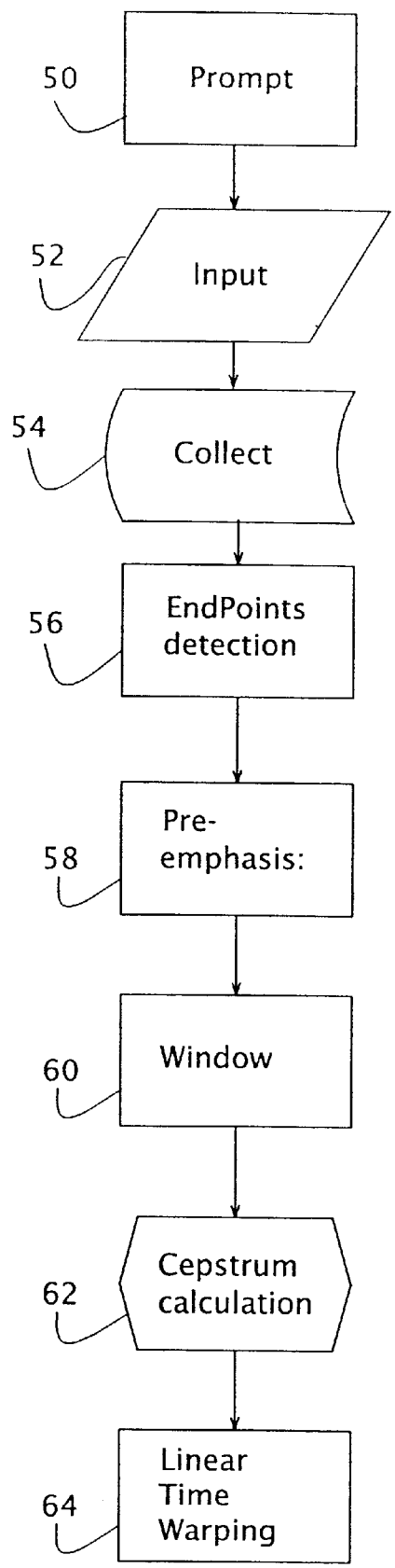
FIG. 4 is a is a flow chart diagram depicting various voice data processing steps utilized by the voice authentication method of the present invention.

Thus, as specifically shown by the flow chart diagram of FIG. 4, a user prompted (50) by system 10, utters (52) phrases to in input device, such as a microphone integrated into a remote computer terminal, such as for example, a personal computer (PC) equipped with a sound card (such as the 16 bit SoundBlaster card from Creative Labs), a microphone and the appropriate software. The sound card collects (54) and digitizes the temporary voice data using high sampling frequency (such as 8 KHz) and high dynamic range (such as 16 bit), thus providing a more accurate voice representation. This enables a bandwidth of 128 Kbits/sec which is two times higher than that carried by an analog telephone line and 12 times higher than that carried by an Internet Phone.

Following encoding, an EndPoints algorithm (56) distinguishes between the actual uttered words and the background noise and a pre-emphasis algorithm (58) compensates for high-frequency attenuation of the uttered words. Step 60 reduces signal deformation using a rectangular window. A voice encoding software translates the high bandwidth voice waveform into a multidimensional vector for short-time (quasi-stationary) spectrum representation, and Cepstrum calculation (62) is performed. Typically for an interval of 20 milliseconds (50 samples per second) twelve Cepstrum coefficients are sufficient for proper voice print representation. The resulting bandwidth of such a representation is 9.6 Kbits/sec and bandwidth compression is higher than 13 fold. Therefore, such a data stream can be transmitted in real time using, for example, an Internet connection. Approximately three seconds of encoded voice print includes about 30 Kbits of information. Additional data that can be co-transmitted along with the voice print includes a user password and a time stamp.

As a final step before communicating this information packet to processing unit 18, Linear Time Warping (64) is performed to bring each information packet to standard length which typically includes 70 frames of 20 milliseconds each.

As is mentioned hereinabove, the stored voice print of each individual can include any number of different stored voice prints generated from different voice data content or from similar voice data content collected at different times and/or different input devices.

It will be appreciated that in cases a temporary voice print must be compared to numerous stored voice prints in order to obtain results.

Thus, according to another preferred embodiment of the present invention, the voice prints generated and stored in the database are partitioned into various groups so as to substantially decrease the number of comparisons effected per session and thereby increase the efficiency of the system of the present invention.

For example, stored voice prints of similar signature or waveform can be grouped together, such that a voice print of an individual identifying him- or herself to the system is matched to the stored voice print of the identified individual and to other similar voice prints included within that group. It will be appreciated that voice print grouping is particularly advantageous in cases wherein a stored voice print database includes numerous entries and thus matching of an authentication voice print to the entire database is considerably time consuming.

Various stored voice print grouping configurations can be realized by the present invention to thereby enhance the efficiency of the matching process. For example, the system of present invention can store voice prints of individuals of a specific location of a multi-location user access system, or take into account the location (input device type and background noise), time of day and the like when grouping similar stored voice prints. Further description to stored voice print configurations is given in Examples 1 and 2 of the Examples section which follows.

Thus, the present invention provides a system and method which can be used for accurate voice authentication regardless of distortion, background noise, and input channel mismatch.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Calculating a Distortion Metrics

Figure 5:
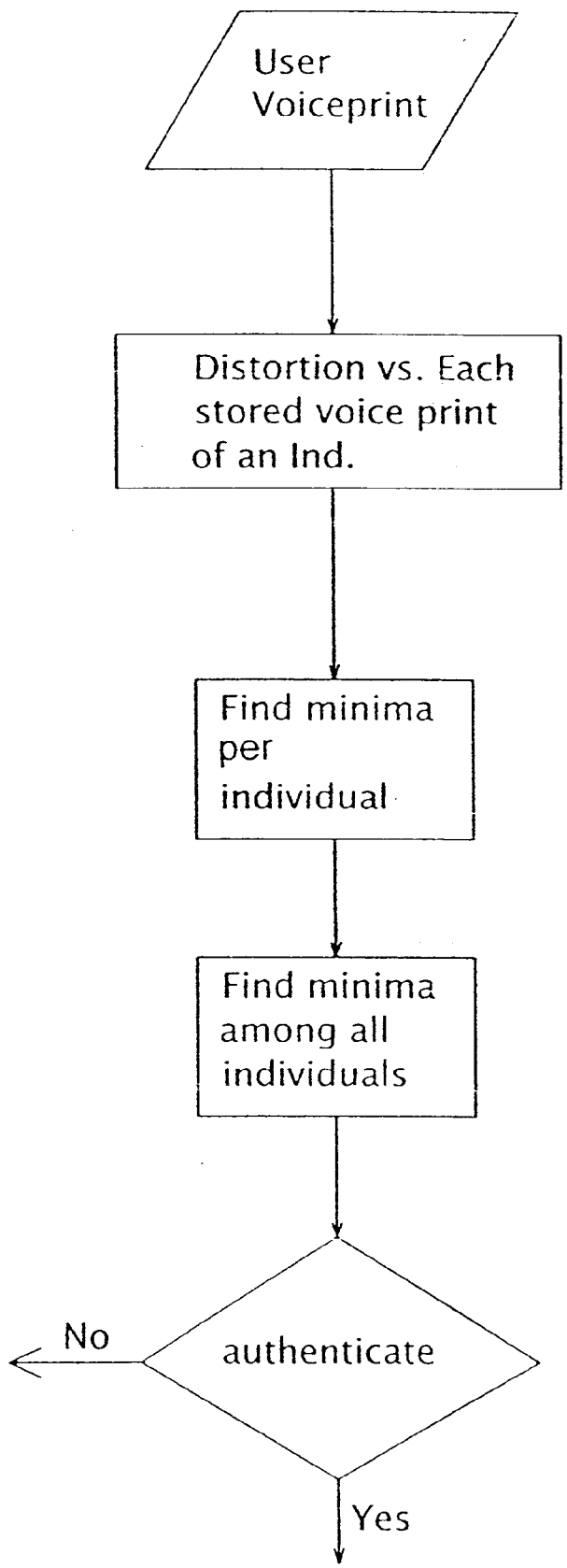
FIG. 5 is a flow chart diagram depicting one embodiment of distortion comparison according to the voice authentication method of the present invention.

FIG. 5 exemplifies a method of comparing the distortion between the temporary voice print and each stored voiceprint of the database utilized by the present invention. As a first step, the temporary voice print is compared to all the various stored voice prints of a single individual the user claims to be. The minimally distorted stored voice print of several stored voice prints of an individual, which are generated for example, from different input sessions represents the most probable match for each user. In cases where the different stored voice prints are generated from different input session, such as, for example, voice prints generated from voice data inputted via different communication channels (different phone lines) or communication modes (different devices), the minimal distortion will correspond to the communication mode identical to that used for generating the stored voice print. In cases where different voice prints of an individual represent different background noise conditions present during input, and/or random errors made by the user, the minimal distortion will correspond to the stored voice print with minimal background noise conditions and minimal user errors.

Following establishment of the minimal distortion stored voice print of the individual the user claims to be, the temporary voice print is compared for distortion against the rest of the voice prints stored in the database.

If the claimed identity of the user matches that of the individual associated with the minimal distortion stored voice print, authentication is achieved.

This approach considerably reduces false rejection since the use of multiple voice prints significantly reduces a possible channel mismatch by matching voice prints inputted via similar communication modes or channels. In addition, such an approach significantly reduces random noise problems by matching voice prints of minimal noise conditions. Finally, this approach also reduces the number of stored voice print inputted required for database establishment.

This approach involves an M×N×L order of computational complexity. It should be noted that with the currently available computer processing speed these computations can be performed in real time for any number of users. For example using a Pentium II 350 MHz processor one can perform dynamic time warping in 1 millisecond. Therefore for typical values of N=100 (N—number of individuals stored in the database), M=10 (M—number of comparison sessions used for matching) and L=3 (L—number of stored voice prints compared each session) total authentication can be achieved in one second.

Obviously, there exists a trade-off between error rates, influenced by the number (N) of individuals stored in the database, the number of sessions used for matching (M) and the number of stored voice prints compared per session (L), and the computational time (T). Thus, a range for N between 10 to 10,000, for M between 1 and 20, and for L between 1 to 10 yields a range of between 0.01 to 200 seconds for T (using a Pentium 11 350 MHz processor).

To reduce the computational time required for authentication, the stored voice prints of each user can be averaged and a representative voice print template generated for each. Next, distortions are compared between the user template generated and the database of stored templates and the ten most similar stored voice prints are uncovered. These stored voice prints comprise a comparison group for future authentication session for that user. By using the ten most probable stored voice for each user for distortion comparison a sufficiently accurate and representative comparison can be achieved. Utilizing this approach, the computational time (T) can be reduced to an order of magnitude lower than that described above.

To further enhance the capabilities of the system of the present invention, the number of valid communication modes and channels from which input of voice data and temporary voice data can be effected can be limited by the system.

For example, the system of the present invention can validate the address (telephone number, cellular telephone number, computer IP address and the like) from which an individual inputs voice data, so as to preferably limit a user identified as the individual to input voice data from these valid communication numbers.

Example 2

Verifying the Accuracy of the System of the Present Invention Using Telephone Line Mediated Remote Input of Voice Data A YOHO database (LDC-Linguistic Data Consortium) was used to test the accuracy of the system of the present invention as compared with prior art voice authentication systems. The test group included 138 test subjects (102 males) of a wide range of ages, vocations and educational backgrounds. The voice data in both database generation sessions and authentication sessions was collected from an office environment via a telephone handset using a 3.8 KHz audio bandwidth. The test subjects were prompted to utter phrases including combination lock numbers (such as 26, 81, 57). The test included four database generation sessions and 10 authentication sessions which were collected over a 3-month period. The voice data uttered was sampled at 8 KHz and 16 bit per sample.

Following sampling, feature extraction was performed which included utterance EndPoints detection (non-speech removal), pre-emphasis to eliminate high-frequency distortion of voiced speech, Hamming windowing into 20 milliseconds frames with 50% overlap (to reduce frequency domain deformation) and 12 Cepstrum coefficients (vocal—tract parameters) calculation per frame (excluding 0-order). The resulting encoded voice print represents a 12-dimensional vector sampled at a 20 milliseconds frame over a duration of 3 seconds.

The matching between each voice print collected during verification sessions and voice prints stored in the database was performed using a dynamic time warping algorithm (DTWV) (non-linear temporal alignment), followed by Mahalanobis (weighted) distortion computation over the 12-dimensional feature space.

Figure 6:
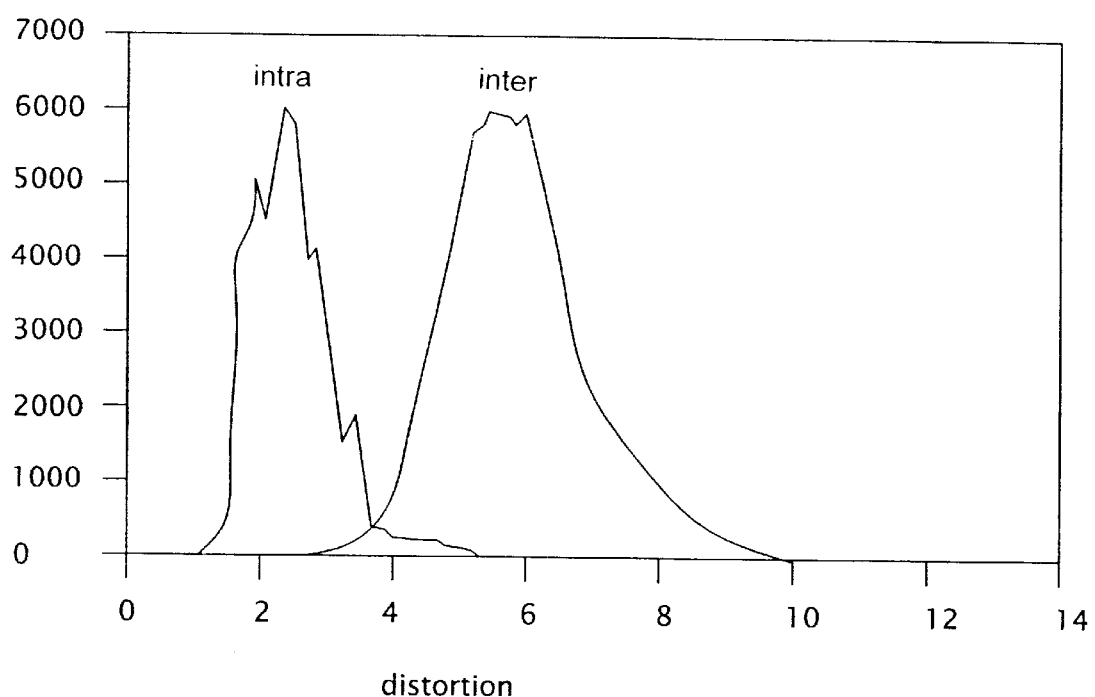
FIG. 6 is a graph depicting voice authentication results obtained for a group of 138 individuals tested using the authentication method of the present invention; the distortion axis describes a match between two voice prints in arbitrary units while the occurrence axis represents the number of times a given distortion has occurred.

As is shown in FIG. 6, which illustrates the number of occurrences of a given distortion metrics between the users' authentication voice print and the users' stored voice print(s) (intra-speaker, left curve), and the number of occurrences of a given distortion metrics between the users' authentication voice print and stored voice prints of other individuals (inter-speaker, right curve), the authentication system of present invention, minimizes false acceptance (FA=0.8%), false rejection (FR=0.4%) and therefor EER (equals to 0.56%) as compared to prior art authentication systems.

Multiple session authentication generated an FR rate of 0.4% (8 false rejection out of 2000 tests) and an FA rate of 0.5%, both of which arise from an inability to further reduce random speaker errors.

In sharp contrast, prior-art verification systems typically generate an EER of 3.3% (the point where FR=FA, see FIG. 7) using an optimal threshold value (T) of 3.83. In practice the performance of prior art threshold-verification systems is even less accurate since the threshold set upon generation of a voice print database is not optimized for voice print data collected during authentication.

Figure 7:
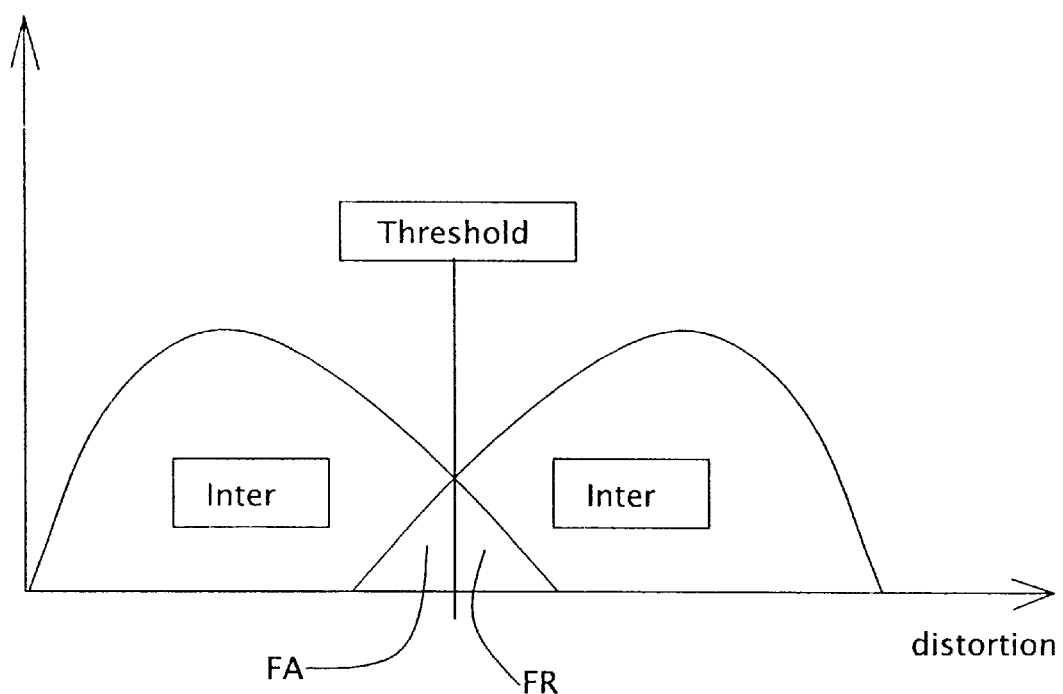
FIG. 7 is a graph depicting the probability for false acceptance and false rejection in prior art voice authentication methods which utilizes a preset threshold value; intra—match occurrence between stored and authentication voice prints of a single user, inter—match occurrence between the database stored voice prints and an authentication voice print of a user.

In prior art methods, the interception point of the stored voice print and the authentication voice print histograms (as shown in FIG. 7) generates errors in verification. Thus, a preset threshold is utilized by prior art system and functions to provide a single parameter describing the variability between individual users and variability for each individual user. Obviously considerable loss of information and accuracy occurs as a result. It can be argued that an ideal threshold would be user-dependent and adaptable, i.e. a threshold for each verification session.

The authentication method of the present invention eliminates the need for a preset threshold by matching a most similar voice print from a plurality of stored voice prints compared. Thus, the present invention provides an ideal "threshold" for each authentication session.

In addition, the present invention overcomes the problems associated with voice variability over time, and mismatch between an enrollment input and verification input. This is accomplished a logical comparison between the identity of an individual associated with a most similar voice print and the temporary voice print which considerably reduces both the false acceptance and the false rejection rates.

Thus, according to the present invention, an impostor is defined as a user not belonging to the voice print database. Since there exist an equal probability of matching an impostor to any voice print in the database, an impostor false acceptance rate will be 1/N (N=number of stored voice prints included in the database). In addition if an impostor belongs to the voice print database, then the false acceptance rate will be close to zero.

As is clearly evident from these results the system of the present invention can provide accurate voice authentication while being substantially unaffected by parameters such as background noise and distortion which severely decrease the accuracy of prior art voice authentication systems.

Example 3

Web Site Authentication

The following example describes an implementation of the authentication system and method of the present invention for the purposes of accessing a Web site, such as, for example, an E-commerce Web site.

Figure 8:
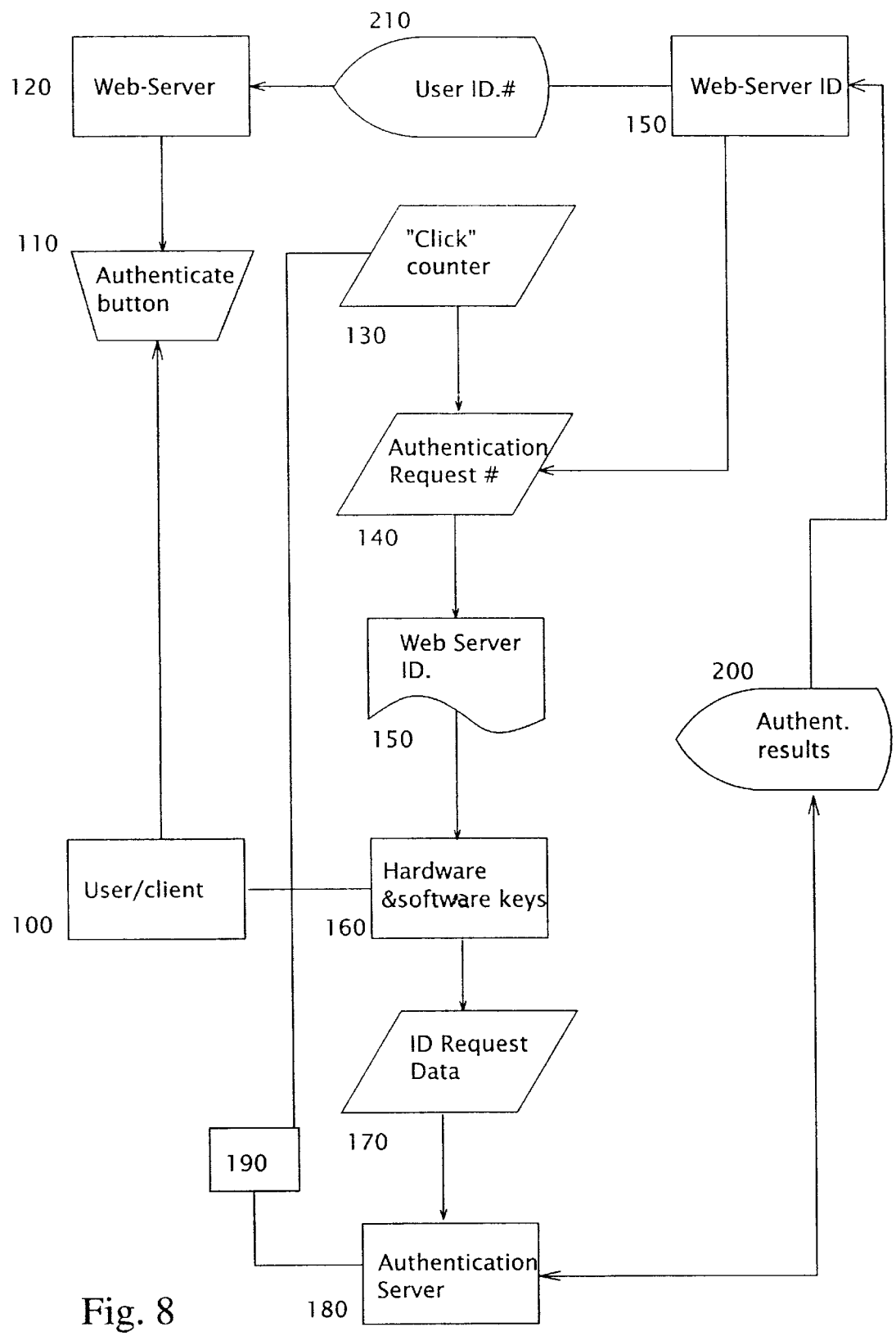
FIG. 8 is a flow chart describing user authentication at a Web site according to the teachings of the present invention.

Thus as shown in FIG. 8, a user operating a user client 100 enters a Web page stored on a Web server 120 and initiates user authentication, by activating an authentication button 110. A click counter 130 generates an authentication request number 140. An E-commerce server 190 communicating with, or integrated into, Web server 120, bundles authentication request number 140, a number 150 identifying Web server 120 (for example, an IP address), user provided voice data (for authentication) and hardware and software keys 160 and communicates this information as an ID request data 170 to an authentication server 180 which is in communication with Web server 120. Server 180 processes data 170 received thereby and returns authentication results 200 to Web server 120 via server 190. The identification results 210 are then displayed on the Web page accessed by the user.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this application shall not be construed as an admission that such reference is available as prior art to the present invention.

What is claimed is:

1. A system for authorizing a user to a secure site, the system comprising:
   (a) a memory unit for storing information including a stored voice print and an identity of each of a plurality of individuals having access to the secured site, said stored voice print of each of said plurality of individuals being generated from a corresponding voice data thereof;
   (b) a first input device for inputting user information for verifying that the user identifies him- or herself as a specific individual among said plurality of individuals;
   (c) a second input device for inputting temporary voice data of the user;
   (d) a first processing unit for generating a temporary voice print from said temporary voice data received from said second input device; and
   (e) a second processing unit for comparing said temporary voice print to said stored voice print of each of at least a portion of said plurality of individuals to provide a distortion level between said temporary voice print and each said stored voice print of each said individual in said at least a portion of said plurality of individuals, at least said portion of said plurality of individuals including said specific individual, whereby said distortion level is smallest when the user and said specific individual are the same person and less than said distortion level between said temporary voice print and said stored voice print of all other individuals of at least said portion of said plurality of individuals, the user being granted access to the secured site based on said smallest distortion level;

wherein said comparing is effected by a voice authentication algorithm selected from the group consisting of a text-dependent and a text-independent voice authentication algorithm.

2. The system of claim 1, wherein said first input device is selected from the group consisting of a keypad and a microphone.

3. The system of claim 1, wherein said first input device communicates with said first processing unit via a communication mode selected from the group consisting of telephone communication, cellular telephone communication, computer network communication and radiofrequency communication.

4. The system of claim 1, wherein said second input device includes a microphone.

5. The system of claim 1, wherein said second input device communicates with said first processing unit via a communication mode selected from the group consisting of telephone communication, cellular telephone communication, computer network communication and radiofrequency communication.

6. The system of claim 1, wherein said first input device and said second input device are integrated into a single input device, whereas said single input device includes a microphone.

7. The system of claim 6, wherein said temporary voice data includes said user information.

8. The system of claim 1, wherein said first processing unit and said second processing unit are integrated into a single processing unit.

9. The system of claim 1, wherein said stored voice print of each of said plurality of individuals has been generated by said first processing unit.

10. The system of claim 1, wherein said voice authentication algorithm is selected from the group consisting of feature extraction followed by pattern matching, a neural network algorithm, a dynamic time warping algorithm, the hidden Markov algorithm and a vector quantization algorithm.

11. The system of claim 1, wherein said first processing unit processes said user information so as to validate that he user identifies him- or herself as a specific individual of said plurality of individuals prior to generating said temporary voice print.

12. The system of claim 1, wherein said plurality of individuals includes at least 10 individuals.

13. The system of claim 1, wherein said corresponding voice data of each of said plurality of individuals includes a plurality of independent voice data inputs.

14. The system of claim 13, wherein said stored voice print of each of said plurality of individuals is generated from at least one of said plurality of independent voice data inputs.

15. The system of claim 1, wherein said first processing unit also extracts at least one voice feature from said temporary voice data.

16. The system of claim 1, wherein the secure site is selected from the group consisting of a virtual site and a physical site.

17. The system of claim 1, wherein said virtual site is a World Wide Web site.

18. A method of authorizing a user access to a secure site, the method comprising the steps of:
  (a) providing a memory unit for storing information including a stored voice print and an identity of each of a plurality of individuals having access to the secured site, said stored voice print of each of said plurality of individuals being generated from a corresponding voice data thereof;
  (b) collecting user information, provided by the user, for verifying that the user identifies him- or herself as a specific individual among said plurality of individuals;
  (c) processing temporary voice data collected from the user into a temporary voice print;
  (d) comparing said temporary voice print with said stored voice print of each of at least a portion of said plurality of individuals to provide a distortion level between said temporary voice print and each said stored voice print of each said individual in said at least a portion of said plurality of individuals, at least said portion of said plurality of individuals including said specific individual, said distortion level being smallest when the user and said specific individual are the same person, and less than said distortion level between said temporary voice print and said stored voice print of all other individuals of at least said portion of said plurality of individuals; and
  (e) identifying said smallest distortion level and granting the user access to the secure site based on said identification;
wherein said comparing is effected by a voice authentication algorithm selected from the group consisting of a text-dependent and a text-independent voice authentication algorithm.

19. The method of claim 18, wherein said user information is provided via an input device selected from the group consisting of a keypad and a microphone.

20. The method of claim 18, wherein said user information is provided via an input device selected from the group consisting of telephone communication, cellular telephone communication, computer network communication and radiofrequency communication.

21. The method of claim 18, wherein said temporary voice data is collected by a microphone.

22. The method of claim 18, wherein said temporary voice data is collected by an input device selected from the group consisting of telephone communication, cellular telephone communication, computer network communication and radiofrequency communication.

23. The method of claim 18, wherein said user information and said temporary voice data are collected by a single input device, whereas said single input device includes a microphone.

24. The method of claim 23, wherein said temporary voice data includes said user information.

25. The method of claim 18, wherein steps (c) and (d) are effected by a single processing unit.

26. The method of claim 18, wherein said stored voice print of each of said plurality of individuals has been generated by said first processing unit.

27. The method of claim 18, wherein said voice authentication algorithm is selected from the group consisting of feature extraction followed by pattern matching, a neural network algorithm, a dynamic time warping algorithm, the hidden Markov algorithm and a vector quantization algorithm.

28. The method of claim 18, further comprising the step of validating that the user has identified him- or herself as said specific individual of said plurality of individuals prior to said step of processing temporary voice data collected from the user into a temporary voice print.

29. The method of claim 18, wherein said plurality of individuals includes at lest 10 individuals.

30. The method of claim 18, wherein said corresponding voice data of each of said plurality of individuals includes a plurality of independent voice data inputs.

31. The method of claim 30, wherein said stored voice print of each of said plurality of individuals is generated from at least one of said plurality of independent voice data inputs.

32. The method of claim 18, wherein said step of processing said temporary voice data collected from the user into said temporary voice print also includes extracting at least one voice feature from said temporary data.

33. The method of claim 18, wherein the secure site is selected from the group consisting of a virtual site and a physical site.

34. The method of claim 18, wherein said virtual site is a World Wide Web site.

35. A system for authorizing a user to a secure site, the system comprising:

(a) a memory unit for storing information including a stored voice print and an identity of each of a plurality of individuals having access to the secured site, said stored voice print of each of said plurality of individuals being generated from a corresponding voice data thereof;

(b) a first input device for inputting user information for verifying that the user identifies him- or herself as a specific individual among said plurality of individuals;

(c) a second input device for inputting temporary voice data of the user;

(d) a first processing unit for generating a temporary voice print from said temporary voice data received from said second input device; and (e) a second processing unit for comparing said temporary voice print to said stored voice print of each of at least a portion of said plurality of individuals to provide a distortion level between said temporary voice print and each said stored voice print of each said individual in said at least portion of said plurality of individuals including said specific individual, access of the user to the secure site being contingent on said distortion level between said temporary voice print and said stored voice print of said specific individual being less than any other said distortion level;

wherein said comparing is effected by a voice authentication algorithm selected from the group consisting of a text-dependent and a text-independent voice authentication algorithm.

36. A method of authorizing a user access to a secure site, the method comprising the steps of:

(a) storing information including a stored voice print and an identity of each of a plurality of individuals having access to the secure site, said stored voice print of each of said plurality of individuals being generated from a corresponding voice data thereof;

(b) collecting user information, provided by the user, for verifying that he user identifies him- or herself as a specific individual among said plurality of individuals;

(c) processing temporary voice data collected from the user into a temporary voice print;

(d) comparing said temporary voice print with said stored voice print of each of at least a portion of said plurality of individuals to provide a distortion level between said temporary voice print and each said stored voice print of each said individual in said at least portion of said plurality of individuals, said at least portion of said plurality of individuals including said specific individual; and (e) granting the user access to the secure site only if said distortion level between said temporary voice print and said stored voice print of said specific individual being less than any other said distortion level;

wherein said comparing is effected by a voice authentication algorithm selected from the group consisting of a text-dependent and a text-independent voice authentication algorithm.

* * * * *

UNITED STATES PATENT AND TRADEMARK OFFICE
CERTIFICATE OF CORRECTION

PATENT NO.     : 6,510,415 B1
DATED          : January 21, 2003
INVENTOR(S)    : Talmor et al.

It is certified that error appears in the above-identified patent and that said Letters Patent is hereby corrected as shown below:

<u>Title page,</u>
Item [30], Foreign Application Priority Data,
Priority Application - IL Patent no -- 129451 -- was mistakenly written as "124951"

Signed and Sealed this

Twenty-ninth Day of July, 2003

JAMES E. ROGAN
*Director of the United States Patent and Trademark Office*